United States Patent [19]

Kelley et al.

[11] 4,315,704
[45] Feb. 16, 1982

[54] SINGLE LINE PNEUMATIC TUBE SYSTEM

[75] Inventors: Charles K. Kelley; William W. Jones, both of Houston, Tex.

[73] Assignee: Charles K. Kelley and Sons Inc., Houston, Tex.

[21] Appl. No.: 195,153

[22] Filed: Oct. 8, 1980

Related U.S. Application Data

[60] Division of Ser. No. 38,168, May 11, 1979, Pat. No. 4,251,169, which is a continuation of Ser. No. 876,112, Feb. 3, 1978, Pat. No. 4,189,261.

[51] Int. Cl.³ .............................................. B65G 51/32
[52] U.S. Cl. ...................................... 406/12; 406/110
[58] Field of Search ....................... 406/2, 12, 13, 110, 406/111, 112

[56] References Cited

U.S. PATENT DOCUMENTS 3,053,475  9/1962  Tonne ............................ 406/112 X
3,419,229  12/1968  Crosby .............................. 406/110

FOREIGN PATENT DOCUMENTS 1278354  9/1968  Fed. Rep. of Germany ...... 406/110
423631   5/1967  Switzerland ........................ 406/110
475897   9/1969  Switzerland ........................ 406/110

Primary Examiner—Jeffrey V. Nase
Attorney, Agent, or Firm—James C. Wray

[57] ABSTRACT

A single line (pressure-vacuum) pneumatic tube system capable of incorporating one or more novel intermediate stations. A unique pressure-vacuum chamber and a novel air shifter valve in the central station provides either pressure or vacuum for the system without turbulence or significant pressure drop. An air relief valve in the tubing significantly reduces noise at the end station. The end station is provided with a valve for return air. The system is unitized eliminating custom design of simple systems.

7 Claims, 8 Drawing Figures

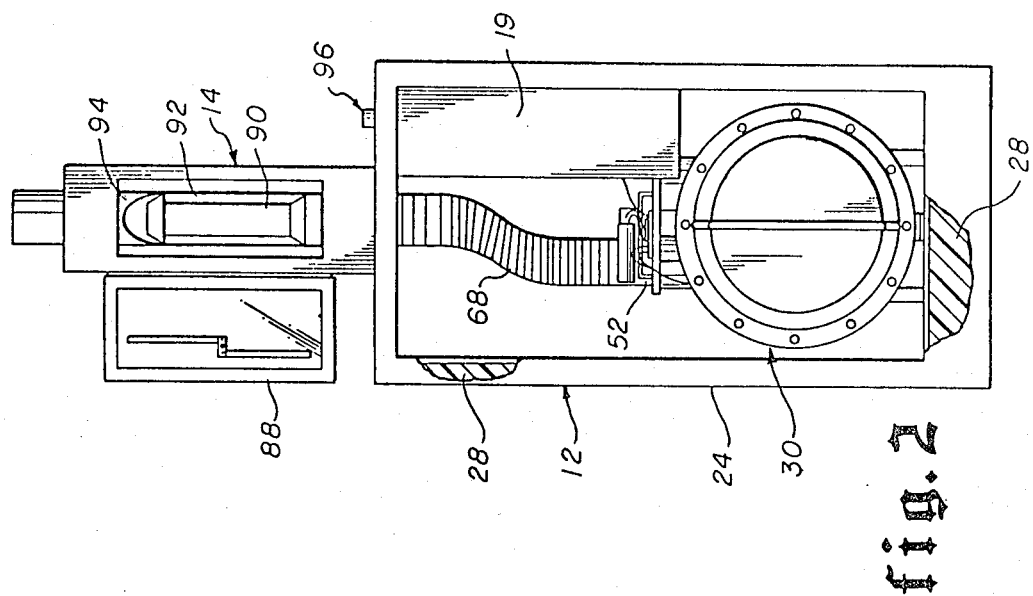
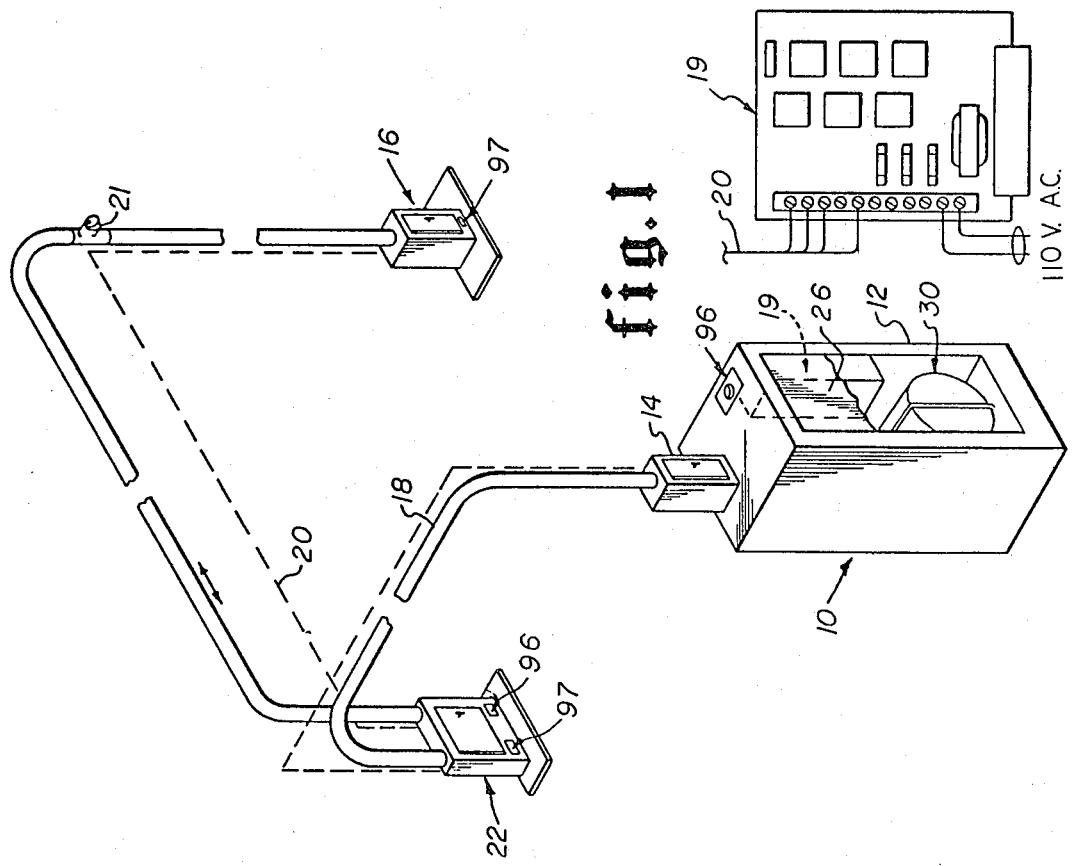

SINGLE LINE PNEUMATIC TUBE SYSTEM

This is a division of application Ser. No. 38,168 filed May 11, 1979, U.S. Pat. No. 4,251,169, which is a continuation of application Ser. No. 876,112 filed Feb. 3, 1978, U.S. Pat. No. 4,189,26, the priority of which is claimed.

BACKGROUND OF THE INVENTION

This invention relates to a unitized single line (pressure-vacuum) pneumatic tube system capable of incorporating intermediate stations, and novel components therefor.

Traditionally, pneumatic tube systems which deliver carriers to one or several locations and back have been custom designed, requiring extensive engineering and selection of various components. Single line pneumatic tube systems are well known in the prior art as exemplified by U.S. Pat. Nos. 2,137,750 and 3,232,559 and are utilized for drive-in banking and tolls as shown in U.S. Pat. Nos. 3,599,898 and No. 3,976,264. Such systems normally use a high powered turbine to provide the necessary air; however, the noise level of the turbine is such that the turbines are located at a remote location from the terminals. Moreover, the air shifter valve for such a system is usually complicated and changes the direction of flow causing turbulence. Although some single line systems do use smaller blowers, they require a blower at each terminal location.

Accordingly, a need has existed for a unitized system which can be packaged and sold by the manufacturer as a complete system eliminating custom design. Also, there is a need for a simple single line pneumatic tube system having a single power unit which is sufficiently quiet that it can be installed in a room where people are working. There is also a need for an air shifter which eliminates changing direction of the air. Further, there is a need for a single line pneumatic tube system which has a minimum of noise at the end terminal and which can include intermediate terminals which can transmit a carrier in either direction without complicated valving.

SUMMARY OF THE INVENTION

The single line pneumatic tube system of the present invention is comprised basically of a central station, including a power unit and a central terminal; an end terminal; tubing connecting the terminals; and low voltage wiring. Intermediate terminals capable of transmitting a carrier in either direction may be included. The power unit includes a pressure-vacuum chamber formed of a housing having a partition plate dividing the housing into two sealed chambers. One or more through flow blowers extend through the plate. The pressure-vacuum chamber has two spaced ports. Mounted on the parts is a novel air shifter valve connected by a length of flexible tubing to the central terminal. The valve has a motor driven angularly reciprocating plate connecting the flexible tubing to either the pressure or vacuum part of the pressure-vacuum chamber. Acoustical insulation in the chamber and housing reduce noise so that the central station may be located where personnel are working. To eliminate noise at the end terminal, the tubing remotely from the end terminal has a flapper valve which allows escape of the air permitting a negative drop to the terminal. The end terminal is provided with an automatic valve providing air during vacuum operation. Each terminal is provided with a guide to facilitate ease of initiating carrier transmission.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

FIG. 1 is a general diagrammatic view showing the novel single tube pneumatic system of the present invention having one intermediate station.

FIG. 2 is a front elevational view of the central station and power unit with the front cover of the power unit removed and the door of the central station open.

DESCRIPTION OF THE PREFERRED EMBODIMENT

Figure 3:
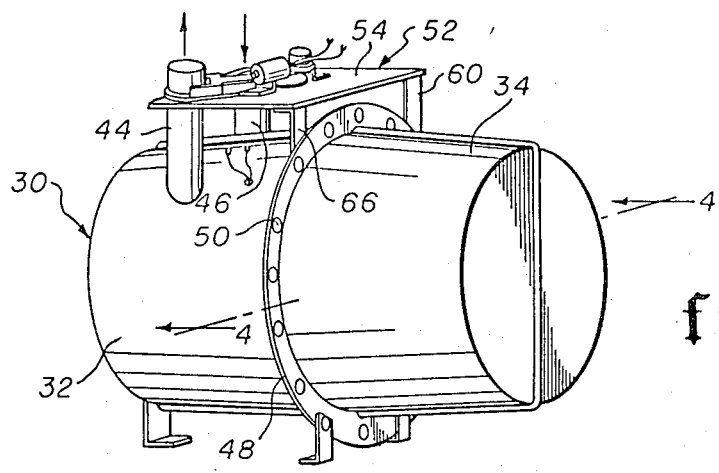
FIG. 3 is an isometric view of the pressure-vacuum chamber and air shifter valve.

As can be seen in FIG. 1, the basic single line pneumatic tube system of the present invention is comprised of a central station 10 which includes a power unit 12, and a central terminal 14, an end terminal 16, and tubing 18 connecting the terminals. The electronics 19 are located in the power unit and low voltage wiring 20 provides electrical connection between terminals. The tubing remote from the end terminal is provided with a flapper air relief valve 21 which will automatically exhaust air after a carrier has passed the air relief valve and therefore there is no air exhaust at the end terminal and practically no noise to disturb personnel in the area. If desired one or more intermediate terminals 22 may be incorporated into the system. The system is so designed that it may be packaged and sold by a manufacturer as a complete system eliminating custom design.

Figure 4:
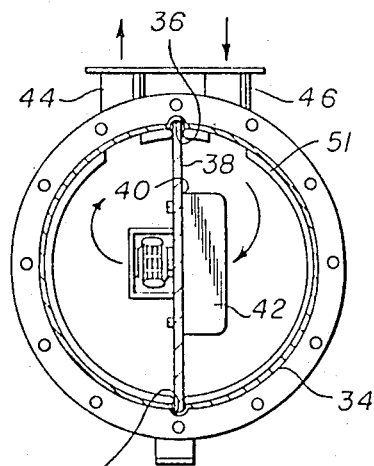
FIG. 4 is a cross sectional view taken along lines 4—4 of FIG. 3.

The central station is so designed that it resembles office furniture with the noise level being sufficiently low that it will not disturb normal office operations. The central station containing power unit 12 is the heart of the system replacing the high noise level turbine traditionally used to produce the air for the system. Moreover, the power unit 12 provides both pressure and vacuum for the entire system. The power unit 12 is formed of a rectangular sheet metal housing 24 having a removable front panel 26. All six interior sides of the housing are provided with acoustical padding 28, which may be sheets of polyester. A pressure-vacuum chamber 30 located in power unit 12 provides both pressure and vacuum, see FIG. 3. The chamber 30 is formed of two rimmed truncated cone housings 32-34 which may be vacuum formed ABS. Each housing member has diametrically opposed longitudinally extending grooves 36—36. As seen in FIG. 4, a central partition plate 38 is located in grooves 36—36. Partition 38 has at least one motor aperture 40 in which is mounted a flow through blower 42. The partition 38 is sealed in the grooves and the motor is sealed in the aperture so that when the chamber is assembled there is a pressure side and vacuum side. It has been found that Lamb Vacuum Motor, Model 115750 having a 2" orifice operates very satisfactorily producing a volume of approximately 110 cfm and a vacuum of 3.4 (inches H$_2$O). The number of motors mounted in the partition 38 will depend upon the size of the system. It has been found that one motor is sufficient for a 2½" or a 3" system, two motors for a 4" or 4½" system and three motors for a 4"×7" system delivering carriers at a speed of approximately twenty five feet per second. Accordingly, partition 38 will have the requisite number of apertures for the system. Front housing member 32 is provided with a pressure port 44 and a vacuum port 46 which are in communication with the pressure and vacuum side of the chamber respectively. The rims 48 of the housing members are provided with apertures and secured together by fasteners 50. To cut down on noise, the inside of the chamber is provided with a layer of acoustical padding 52 which may be sheet polyester. Thus pressure-vacuum chamber provides both air pressure to move a carrier from the central terminal to a remote terminal and vacuum to return the carrier from a remote terminal to the central terminal.

Figure 5:
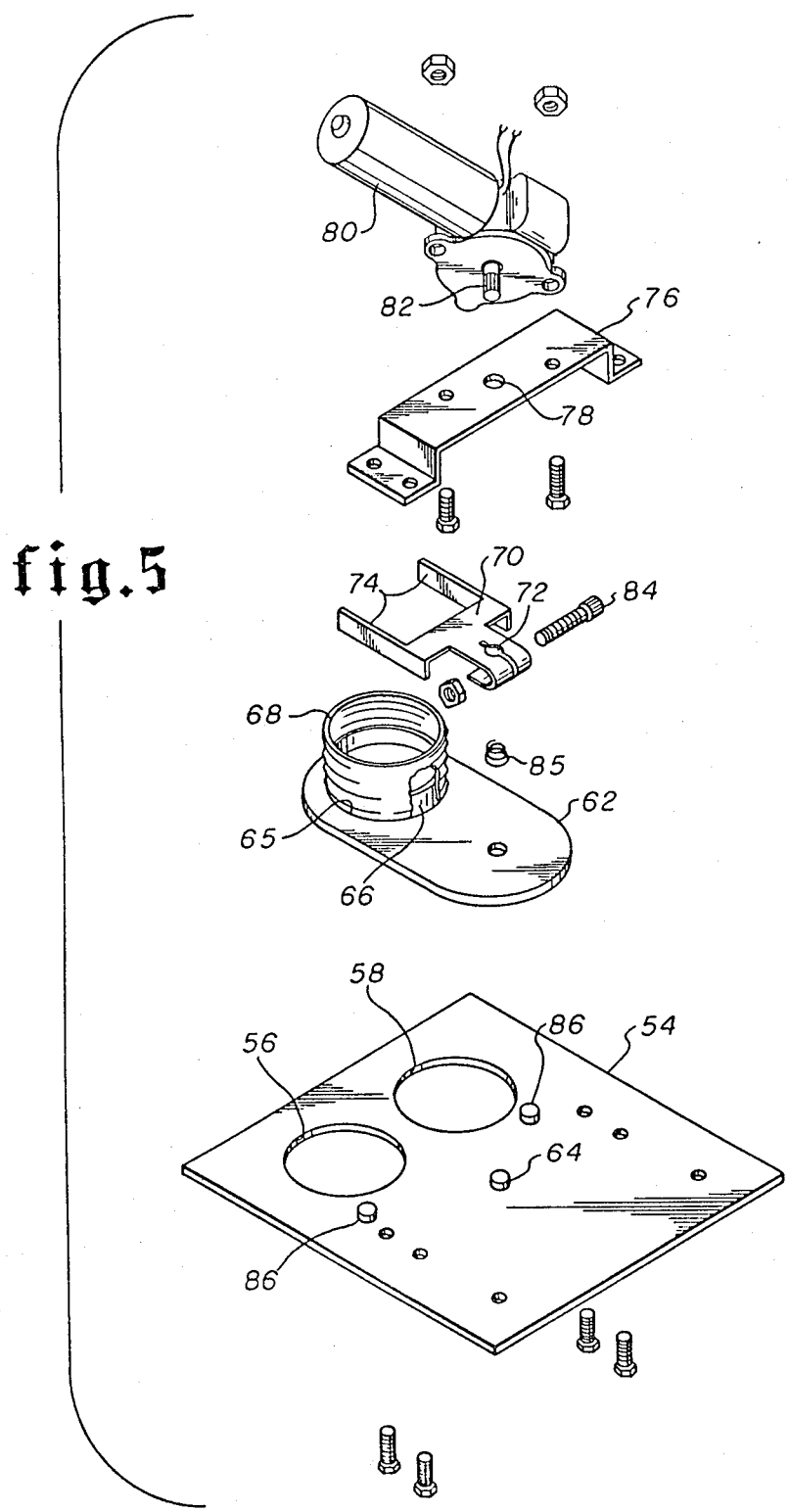
FIG. 5 is an exploded view of the air shifter valve.

To shift operation from pressure to vacuum an air shifter valve 52 shown in exploded relation in FIG. 5 is connected to pressure and vacuum ports 44-46. The air shifter valve is formed of a base plate 54 which has ports 56-58 which are sealingly attached to pressure and vacuum ports 44-46. The base plate may be secured to the pressure vacuum chamber by brackets 60 which are attached to the rim of the pressure-vacuum chamber. Positioned on top of the base plate 54, is a pivotable member 62 which is pivoted at one end about a stud 64 extending up from the base plate 54. The other end of pivotable member 62 is provided with a port 65 for registry with one of the ports 56-58 in the base plate. An upstanding portion 66 surrounds the port 65. A flexible tubing 68 is attached to the portion 66 and extends up to and attaches with the inlet of central terminal 14. To move pivotable member 62 from registry with pressure port 56 to registry with vacuum port 58 and visa versa, there is a pivotable fork member 70 which has a pivot slot 72 concentric with the stud 64 and bifurcated arms 74—74 which surround the upstanding portion 66. A bridge member 76 having an aperture 78 over lying pivot stud 64 is attached to base plate 54. Attached to bridge member 76, there is a drive motor 80 having a drive shaft 82 which extends through aperture 78 and pivot slot 72 and is attached to fork 70 by connecting means 84. It has been found that Model MO 581315A by American Bosch Arms Corporation will provide the proper actuation, 60° reciprocation. To assure proper registry, the base plate 54 is provided with stops 86—86. To prevent strain on drive motor 80 during start up and stopping, parts 56-58 may be placed so that the included angle from the pivot point to the centers of the ports 56-58 is 57° with the arms 74—74 of fork 70 slightly wider than the upstanding portion 66. Therefore, there will be some play at each end of travel. To maintain the pivotable plate in contact with the base plate 54 a spring member 85 is positioned between the end of the shaft 82 and the pivotable member 62.

As set forth above, the central terminal 14 is located on top of the power unit 12 and is provided with pressure or vacuum from the pressure-vacuum chamber 30 by the air shifter valve 52 through flexible tubing 68. The central terminal 14 is provided with a door 88 for inserting or removing a carrier 90. The terminal 14 is also provided with a guide 92 terminating at its top end in a full round section of tubing 94. To start operation, the carrier is inserted into guide 92 with the felt of the carrier in contact with tubing section 94. The door 88 is then closed which seals the system.

Figure 8:
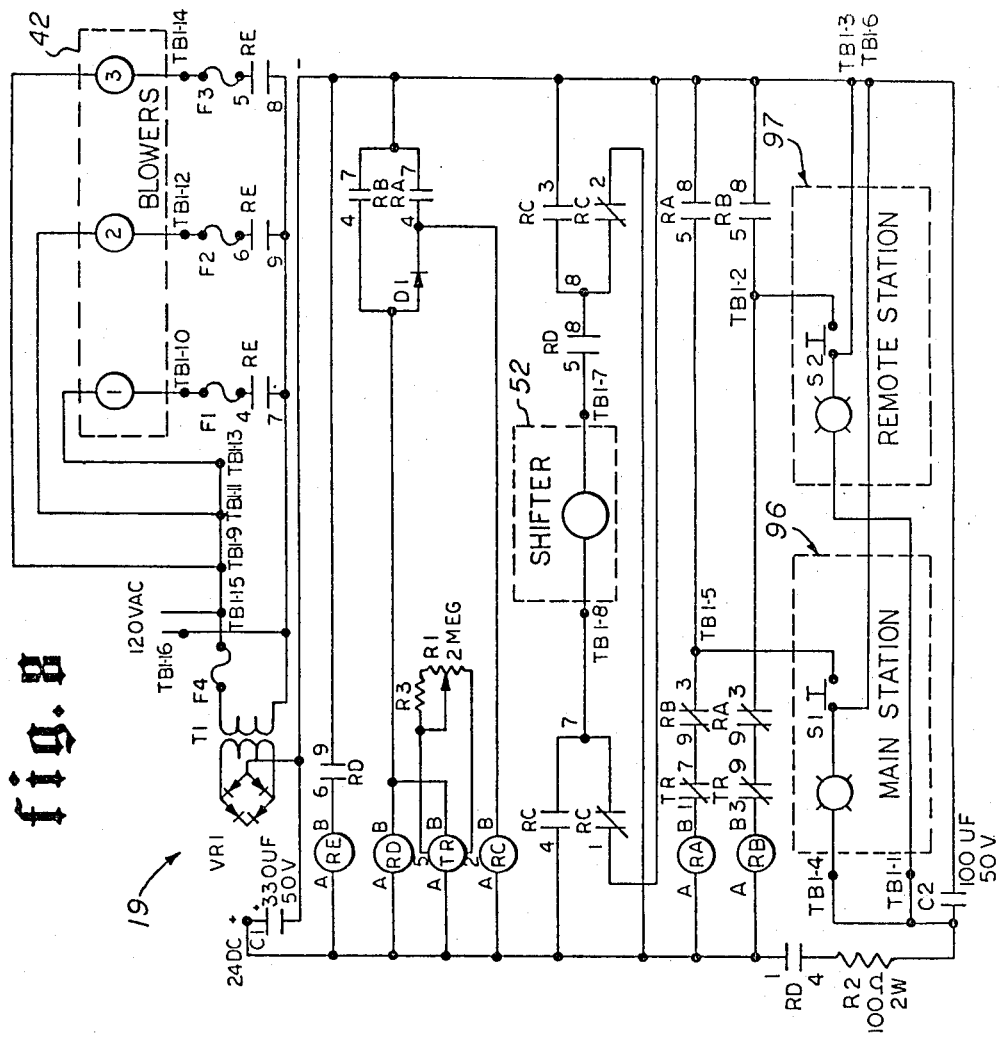
FIG. 8 is a schematic of master electrical control panel.

Electrical power for the entire system is provided by attaching an electrical cable provided with a male plug to a 120 volt alternating current outlet thereby eliminating the necessity of special electrical wiring. The motors 42 run on 120 vac. All other components including the motor for the air shifter valve operate on 24 volt direct current. FIG. 8 is a schematic of the electronics 19 which are of the plug in type located on a panel in the power unit, see FIG. 1. Each terminal is provided with a push button switch which is illustrated when on. The switch for pressure operation is labeled 96 and the one for vacuum operation 97. Engagement of any switch commences operation of the system. As can be seen in FIG. 8, engagement of push button 96 illuminates the lights to show the system is in operation. It also allows current to flow to relay RA energizing it and closing normally open contacts RA. This allows current to flow to relay RC energizing it and thereby closing normally open contacts RC and opening normally closed contacts RC. Current also flows to timer TR and relay RD which closes normally open contacts RD permitting current to flow to relay RE energizing it and contacts RE which commences operation of blowers 42. At the same time, drive motor 80 of air shifter valve 52 is energized, moving pivotable member 62 to a position where port 65 is in registry with pressure port 44 and air from the pressure side of pressure-vacuum chamber 30 is provided through flexible tubing 68 to the inlet of central terminal 14 causing the carrier to travel through tubing 18 to the next terminal. The system is powered so that the carrier will travel at approximately twenty five feet per second. The timer TR may be adjusted from 8 seconds to 180 seconds. After the set period, the timer relay will open the contacts TR cutting off the flow of low voltage power and shutting off the system. If switch 97 is energized, similar operations will take place except that air shifter valve 52 will move the pivotable member 62 to the position where port 65 will be in registry with the vacuum port 46.

Figure 7:
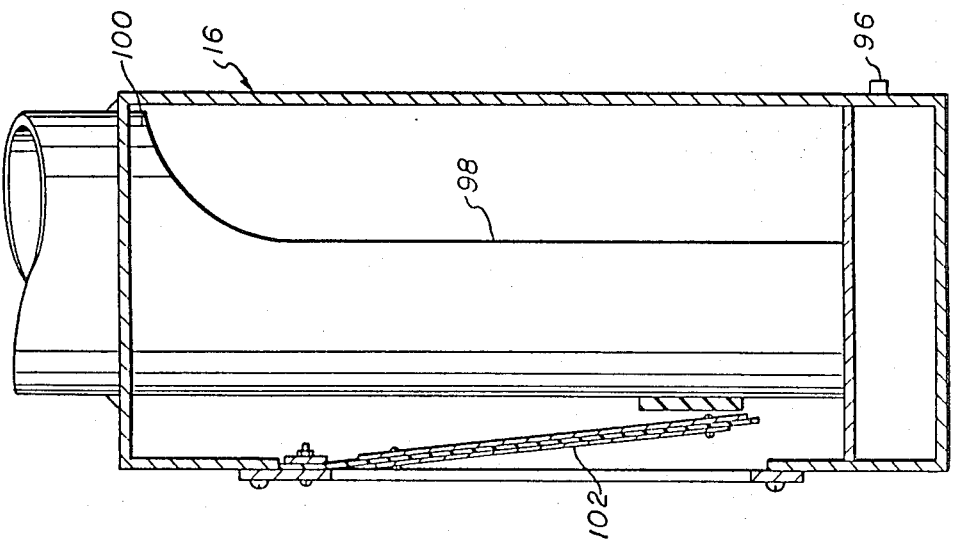
FIG. 7 is a cross sectional side view of the end terminal with the valve open for vacuum operation.

As previously mentioned, there is an air relief valve 21 located in the vertical run of tubing remotely spaced from end terminal 16. After the carrier passes this point, air will flow through the relief valve and the carrier will free fall to the end terminal. Therefore, escape of air pressure occurs away from the end terminal and operation is quiet. As can be seen in FIG. 7, the end terminal 16 is provided with a guide 98 similar to guide 92 of the central terminal. Guide 98 has a section of tubing 100 for insertion of the carrier into the system. Also, the bottom of the end terminal is provided with shock absorbing padding. End terminal 16 also is provided with a flap valve 102 which is closed during pressure operation but which automatically opens during vacuum operation to provide air behind the carrier.

Figure 6:
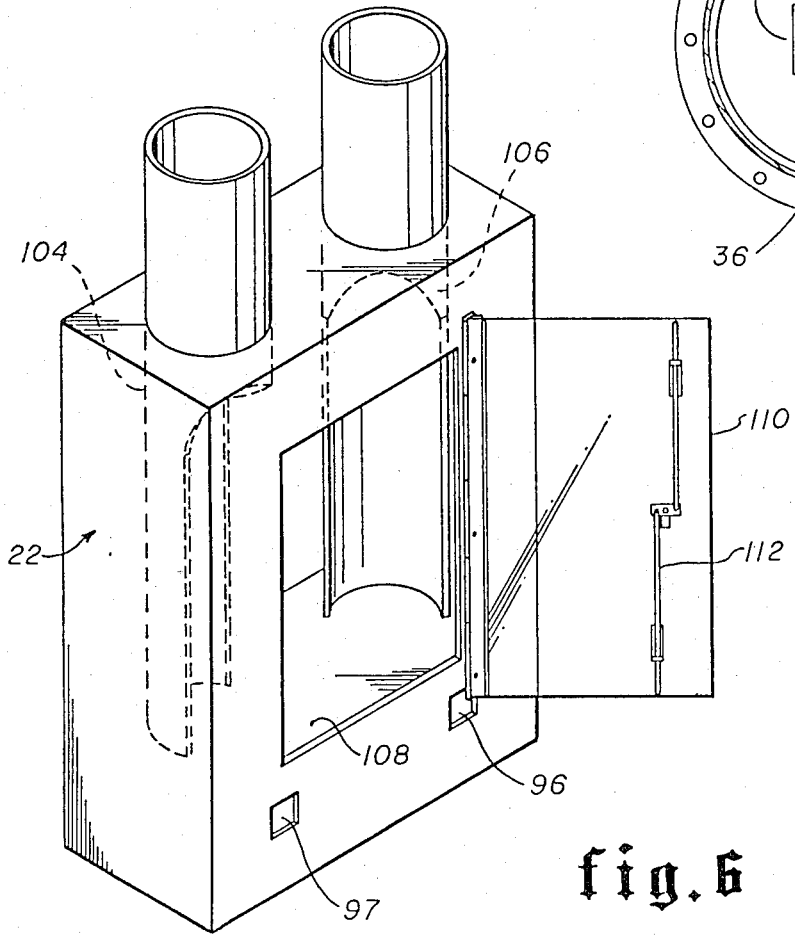
FIG. 6 is an isometric view of the intermediate terminal.

In addition to central terminal 14 and end terminal 16, the system may include one or more intermediate terminals 22. As can be seen in FIG. 6, the intermediate terminal is provided with a roof having two spaced ports receiving two spaced facing guides 104—104 each of which has an opening portion facing the other. The guides similar to the guides of the other terminals have a portion of full tubing 106 for insertion of the carrier into the system. The intermediate terminal has a cushion 108 of shock absorbing material to absorb the shock of the carrier. The guides 104—104 are spaced a sufficient distance from the bottom of the terminal so that air may pass around the carrier after the carrier is in the terminal. The intermediate terminal is so designed that it will receive and transmit carriers from either direction. Accordingly, intermediate terminal 22 is provided with switch 96 to provide pressure operation to forward a carrier to end terminal 16 or another intermediate terminal. Terminal 22 is also provided with switch 97 to commence vacuum operation to return a carrier to the central terminal or an intermediate terminal located between the central terminal and intermediate terminal. Intermediate terminal 22 has a door 110 for removing or inserting a carrier. As can be seen in FIG. 6, the door 110 has a latch 112 which makes three point contact with the inside of the front panel to assure full closure. Door 88 of central terminal 14 is provided with similar latch. The latches provide positive closure for an air tight system.

As can be seen from the foregoing, the pneumatic tube system of the present invention is so designed that it may be packaged as a unit and easily installed. The central station includes the power unit and central terminal and the only electrical connection is attachment to a normal 120 volt alternating current outlet. Both pressure and vacuum is provided by the novel pressure-vacuum chamber that is powered by small flow through blowers. The system is shifted from pressure to vacuum by the novel air shifter valve which does not require changing of direction and subsequent turbulence. Intermediate terminals may be incorporated into the system and carriers may be received and transmitted in either direction from the intermediate terminal. To provide quite operation at the end terminal, an air relief valve is located in the tubing remotely spaced from the end terminal. To provide air in back of the carrier during vacuum operation, the end terminal has a flapper valve which automatically opens during vacuum operation.

What is claimed is:

1. A single line, pressure-vacuum pneumatic tube system comprising:
    a central station having a terminal to dispatch or receive a carrier, pressure-vacuum power means providing pressure and vacuum, means selectively connecting the power means to the terminal to provide pressure or vacuum to the terminal, means energizing the power means and the selectively connecting means;
    an end station having a terminal to receive or dispatch a carrier;
    at least one intermediate station having a terminal to receive or dispatch a carrier;
    a single line of tubing connecting the terminal of the central station with the terminal of the intermediate station;
    a single line of tubing connecting the terminal of the intermediate station to the terminal of the end station;
    the intermediate station provided with means to energize the power means and selectively connecting means to provide vacuum to the system whereby a carrier may be dispatched toward the central station and means to energize the power means and selectively connecting means to provide pressure to the system whereby a carrier may be dispatched toward the end station; and
    the end station provided with means to energize the power means and selectively connecting means to provide vacuum to the system whereby a carrier may be dispatched toward the intermediate terminal;
    the intermediate terminal comprising a housing having a roof provided with two spaced ports, each port having a guide portion extending downward into the housing and terminating above the bottom of the intermediate terminal, so that air will flow around the carrier positioned in the housing, the upper end of the guide portion having a cylindrical portion extending downward into the intermediate terminal to facilitate insertion of the carrier for transmission, the intermediate terminal receiving and transmitting carriers in either direction.

2. The pneumatic tube system specified in claim 1 wherein the pressure-vacuum power means is formed of a housing having a central plate dividing the housing into two sealed chambers, at least one flow through blower sealingly mounted in the plate, a port for each of the chambers.

3. The system specified in claim 1 wherein there is a cushion at the bottom of the intermediate terminal to absorb shock.

4. The system of claim 1 further comprising indicator means connected to the intermediate station for indicating when the power means and selectively connecting means are energized.

5. The system of claim 1 further comprising timer means for automatically de-energizing the power means and selectively connecting means after a preselected period of time.

6. A single line, pressure-vacuum pneumatic tube system comprising:
    a central station having a terminal to dispatch or receiver a carrier, pressure-vacuum power means providing pressure and vacuum, means selectively connecting the power means to the terminal to provide pressure or vacuum to the terminal, means energizing the power means and the selectively connecting means;
    an end station having a terminal to receive or dispatch a carrier;
    at least one intermediate station having a terminal to receive or dispatch a carrier;
    a single line of tubing connecting the terminal of the central station with the terminal of the intermediate station;
    a single line of tubing connecting the terminal of the intermediate station to the terminal of the end station;
    the intermediate station provided with means to energize the power means and selectively connecting means to provide vacuum to the system whereby a carrier may be dispatched toward the central station and means to energize the power means and selectively connecting means to provide pressure to the system whereby a carrier may be dispatched toward the end station; and
    the end station provided with means to energize the power means and selectively connecting means to provide vacuum to the system whereby a carrier may be dispatched toward the intermediate terminal,
    the intermediate terminal comprising a housing having two ports, two sections of tubing, one extending into each port forming a guide member, each member having an inward opening semi-cylindrical portion extending into the interior of the housing and terminating above the bottom of the terminal, the semi-cylindrical portions being similar and spaced and facing each other so that air from either tubing will flow around a carrier to start its transmission, each guide member having within the terminal a full section of tubing to facilitate insertion of a carrier into the tubing for transmission, the terminal receiving and transmitting carriers in either direction through either port.

7. The system of claim 1 or 6 wherein:

the intermediate station is provided with first switch means to energize the power means and selectively connecting means to provide vacuum to the system whereby a carrier may be dispatched toward the central station and second switch means to energize the power means and selectively connecting means to provide pressure to the system whereby a carrier may be dispatched toward the end station, said first and second switch means being connected to a control circuit comprising, first relay means connected to the power means and a source of power for interrupting power to the power means when in a normal open state and communicating power to the power means when in a closed state, second relay means connected to the selectively connecting means and a source of power for providing power to the selectively connecting means to provide vacuum to the system in a first state and providing power to the selectively connecting means to provide pressure to the system in a second state, third relay means connected to the first switch means and the second relay means for placing the second relay means in the first state upon actuation of the first switch, fourth relay means connected to the second switch means and the second relay means for placing the second relay means in the second state upon actuation of the second switch, and fifth relay means connected to the first relay means and the first and second switch means for closing the first relay means when either the first or second switch means is actuated.

* * * * *